(12) United States Patent
Su

(10) Patent No.: US 9,961,999 B1
(45) Date of Patent: May 8, 2018

(54) UNDERMOUNT SLIDE RAIL ASSEMBLY

(71) Applicant: Guangdong XingPeng Industrial Co., Ltd., Jieyang, Guangdong Province (CN)

(72) Inventor: Shu-Peng Su, Jieyang (CN)

(73) Assignee: Guangdong XingPeng Industrial Co., Ltd., Jieyang (CN)

( * ) Notice: Subject to any disclaimer, the term of this patent is extended or adjusted under 35 U.S.C. 154(b) by 0 days. days.

(21) Appl. No.: 15/475,250

(22) Filed: Mar. 31, 2017

(30) Foreign Application Priority Data

Feb. 16, 2017 (CN) .......................... 2017 1 0083047

(51) Int. Cl.
    *A47B 88/00* (2017.01)
    *A47B 88/487* (2017.01)
    *F16C 29/04* (2006.01)
    *A47B 88/437* (2017.01)

(52) U.S. Cl.
    CPC .......... *A47B 88/487* (2017.01); *A47B 88/437* (2017.01); *F16C 29/04* (2013.01); *F16C 2314/72* (2013.01)

(58) Field of Classification Search
    CPC ..... A47B 88/487; A47B 88/40; A47B 88/493; A47B 88/49; A47B 88/437; A47B 88/443
    See application file for complete search history.

(56) References Cited

U.S. PATENT DOCUMENTS

| 5,769,518 | A * | 6/1998 | Grabher | A47B 88/493 312/334.12 |
| 6,682,160 | B2 * | 1/2004 | Kung | A47B 88/493 312/334.12 |
| 7,866,772 | B1 * | 1/2011 | Chen | A47B 88/493 312/334.13 |
| 8,152,252 | B2 * | 4/2012 | Liang | A47B 88/493 312/334.6 |
| 8,277,003 | B2 * | 10/2012 | Milligan | A47B 88/493 312/334.33 |
| 8,678,529 | B2 * | 3/2014 | Li | A47L 88/40 312/334.37 |
| 9,044,088 | B2 * | 6/2015 | Greussing | A47L 88/04 |
| 9,596,932 | B2 * | 3/2017 | Greussing | A47L 88/487 |
| 9,661,926 | B2 * | 5/2017 | Friesenecker | A47B 88/493 |

* cited by examiner

*Primary Examiner* — Daniel J Rohrhoff
(74) *Attorney, Agent, or Firm* — Alan D. Kamrath; Kamrath IP Lawfirm, P.A.

(57) ABSTRACT

An undermount slide rail assembly includes a main slide rail having a primary track. An inner slide rail includes an auxiliary track and an outer track connected to the auxiliary track. A bottom track is connected to the outer track and is located opposite to the auxiliary track. An inner track is connected to the auxiliary track and is located opposite to the outer track. An outer slide rail includes an assembling board and inner and outer boards connected to two edges of the assembling board. The inner slide rail is slideably received in the outer slide rail. A first sliding assistance board is slideably connected to the main slide rail and the inner slide rail. A second sliding assistance board is slideably connected to the inner and outer slide rails. At least one of the first and second sliding assistance boards is provide with both of rollers and balls.

10 Claims, 3 Drawing Sheets

UNDERMOUNT SLIDE RAIL ASSEMBLY

CROSS REFERENCE TO RELATED APPLICATIONS

The application claims the benefit of China application serial No. 201710083047.2, filed on Feb. 16, 2017, and the entire contents of which are incorporated herein by reference.

BACKGROUND OF THE INVENTION

1. Field of the Invention

The present invention relates to an undermount slide rail assembly and, more particularly, to an undermount slide rail assembly mounted between a drawer and a piece of furniture to permit easy opening and closing of the drawer.

2. Description of the Related Art

Most furniture, such as desks, cabinets, closets, and file cabinets, generally include a pair of slide rail assemblies between a drawer and the furniture for slidingly supporting the drawer to permit easy opening and closing of the drawer.

A common undermount slide rail assembly is mounted below a drawer for connection with the furniture. Since the weight of the drawer directly acts downwardly on the undermount slide rail assembly, many rollers are provided to assist in supporting and sliding at the costs of noise during sliding. Furthermore, the sliding smoothness is not satisfactory. Improvement is, thus, required.

SUMMARY OF THE INVENTION

To solve the above disadvantages, the present invention provides an undermount slide rail assembly including at least one sliding assisting board, balls, and rollers to reduce the sound resulting from sliding and to increase the sliding smoothness.

When the terms "front", "rear", "left", "right", "up", "top", "down", "bottom", "inner", "outer", "side", and similar terms are used herein, it should be understood that these terms have reference only to the structure shown in the drawings as it would appear to a person viewing the drawings and are utilized only to facilitate describing the invention, rather than restricting the invention.

An undermount slide rail assembly according to the present invention includes a main slide rail having an outer wall and an inner wall opposite to the outer wall. A primary track extends from the inner wall toward the outer wall. An inner slide rail includes an auxiliary track and an outer track having an edge connected to an edge of the auxiliary track. The inner slide rail further includes a bottom track connected to the other edge of the outer track and located opposite to the auxiliary track. The inner slide rail further includes an inner track connected to the other edge of the auxiliary track and located opposite to the outer track. An outer slide rail includes an assembling board having first and second edges. The outer slide rail further includes an outer board connected to the first edge of the assembling board and an inner board connected to the second edge of the assembling board and located opposite to the outer board. The inner slide rail is slideably received in the outer slide rail. A first sliding assistance board is slideably connected to the main slide rail and the inner slide rail. A second sliding assistance board is slideably connected to the inner slide rail and the outer slide rail. A plurality of rollers and a plurality of balls are provided. Both of the plurality of rollers and the plurality of balls are mounted on at least one of the first and second sliding assistance boards.

Thus, the undermount slide rail assembly according to the present invention provides rollers and balls on at least one sliding assistance board to reduce the sliding sound and to increase the sliding smoothness. Thus, the overall sense of quality is increased.

In an example, the outer track of the inner slide rail is located between the primary track and the outer wall of the main slide rail. The auxiliary track of the inner slide rail is located above and aligned with the primary track of the main slide rail. The bottom track of the inner slide rail is located below and aligned with the primary track of the main slide rail. The inner track of the inner slide rail is aligned with the inner wall of the main slide rail. This structure is simple and is easy to manufacture and assemble, reducing the manufacturing costs and increasing assembling convenience.

In an example, the assembling board of the outer slide rail is aligned with the auxiliary track of the inner slide rail. The outer board of the outer slide rail is aligned with the outer track of the inner slide rail. The inner board of the outer slide rail is aligned with the inner track of the inner slide rail. This structure is simple and is easy to manufacture and assemble, reducing the manufacturing costs and increasing assembling convenience.

In an example, both of the plurality of rollers and the plurality of balls are mounted on the second sliding assistance board between the inner slide rail and the outer slide rail. When the weight of the drawer generates a smaller torque on the whole undermount slide rail assembly, use of the balls increases the sliding smoothness and reduces the sliding sound. On the other hand, when the torque resulting from the weight of the drawer acting on the whole undermount slide rail assembly is larger, the rollers increase the stability during sliding movement of the drawer.

In an example, the outer track of the inner slide rail includes a ball groove. The plurality of balls is received in the ball groove and is located between the plurality of rollers and the outer wall of the main slide rail. Thus, the balls can provide a hooking effect for the inner slide rail to prevent the outer slide rail from flipping inward. Thus, the balls also increase the sliding stability.

In an example, the first sliding assistance board is slideably connected to the primary track and the inner wall of the main slide rail. Furthermore, the first sliding assistance board is in sliding contact with the auxiliary track, the bottom track, and the inner track of the inner slide rail. This structure is simple and is easy to manufacture and assemble, reducing the manufacturing costs and increasing assembling convenience.

In an example, the first sliding assistance board includes a side groove portion, an upper groove portion connected to the side groove portion, and a lower groove portion connected to the upper groove portion. A first groove is defined between the side groove portion, the upper groove portion, and the lower groove portion. The primary track and the inner wall of the main slide rail extend through the first groove. Some of the plurality of rollers are received in the side groove portion, the upper groove portion, and the lower groove portion. This structure is simple and is easy to manufacture and assemble, reducing the manufacturing costs and increasing assembling convenience.

In an example, the second sliding assistance board is slideably connected to the auxiliary track, the outer track, and the inner track of the inner slide rail. Furthermore, the second sliding assistance board is in sliding contact with the assembling board, the outer board, and the inner board of the outer slide rail. This structure is simple and is easy to manufacture and assemble, reducing the manufacturing costs and increasing assembling convenience.

In an example, the second sliding assistance board includes a top groove portion, an outer groove portion, and an inner groove portion. The outer and inner groove portions are respectively connected to two ends of the top groove portion, defining a second groove between the top groove portion, the outer groove portion, and the inner groove portion. The inner slide rail extends through the second groove. Some of the plurality of rollers are received in the top groove portion and the inner groove portion. The plurality of balls is received in the outer groove portion. This structure is simple and is easy to manufacture and assemble, reducing the manufacturing costs and increasing assembling convenience.

In an example, each of the plurality of rollers is received in the inner groove portion has an axial height. Each of the plurality of balls is at least partially located within the axial height in a radial direction of one of the plurality of rollers to increase the sliding stability of the second sliding assistance board.

The present invention will become clearer in light of the following detailed description of illustrative embodiments of this invention described in connection with the drawings.

DETAILED DESCRIPTION OF THE INVENTION

Figure 1:
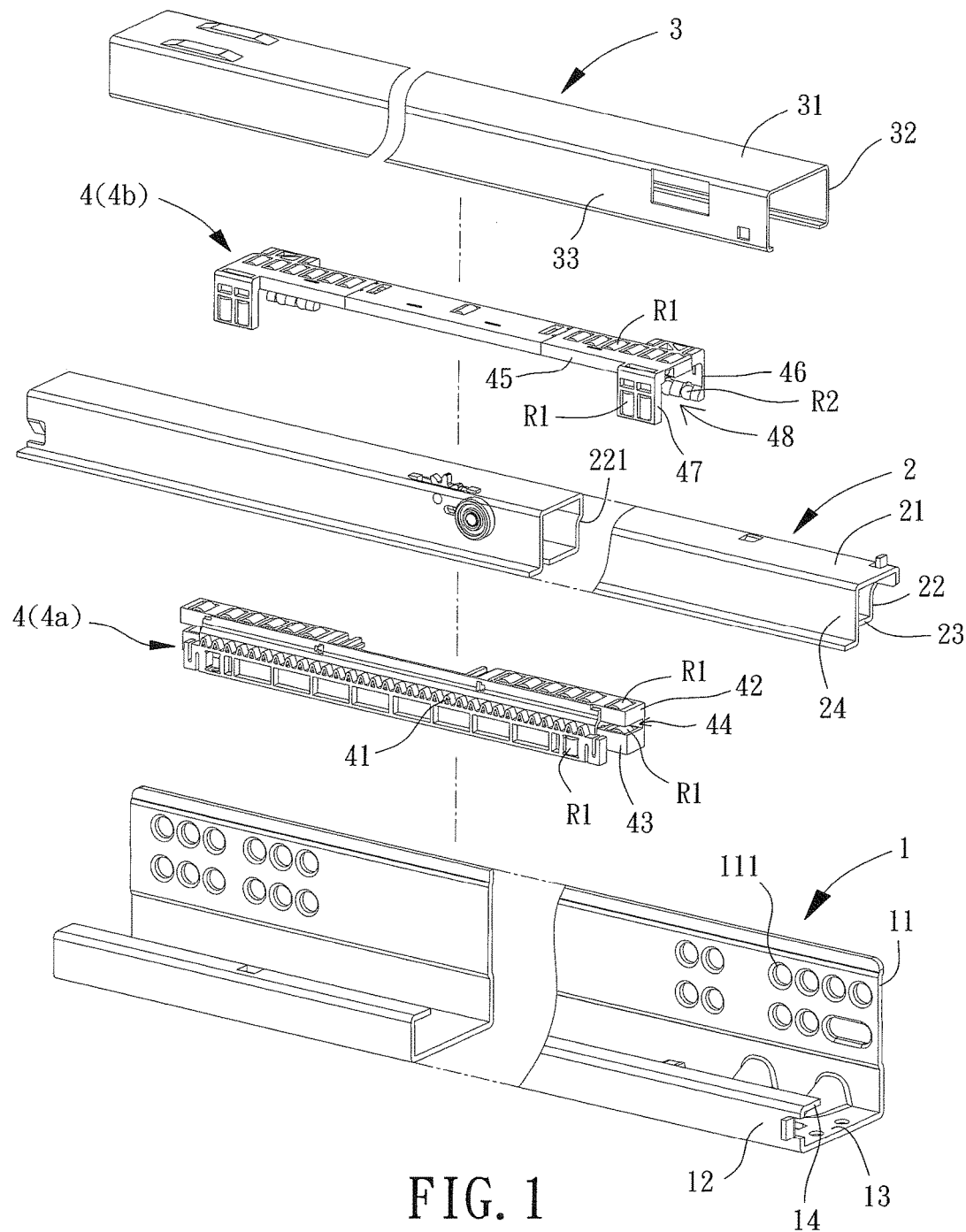
FIG. 1 is an exploded, perspective view of an undermount slide rail assembly of an embodiment according to the present invention.

With reference to FIG. 1, an undermount slide rail assembly of an embodiment according to the present invention includes a main slide rail 1, an inner slide rail 2, an outer slide rail 3, and at least two sliding assistance boards 4. One of the at least two sliding assistance boards 4 is slideably connected to the main slide rail 1 and the inner slide rail 2. Anther of the at least two second sliding assistance boards 4 is slideably connected to the inner slide rail 2 and the outer slide rail 3.

Figure 2:
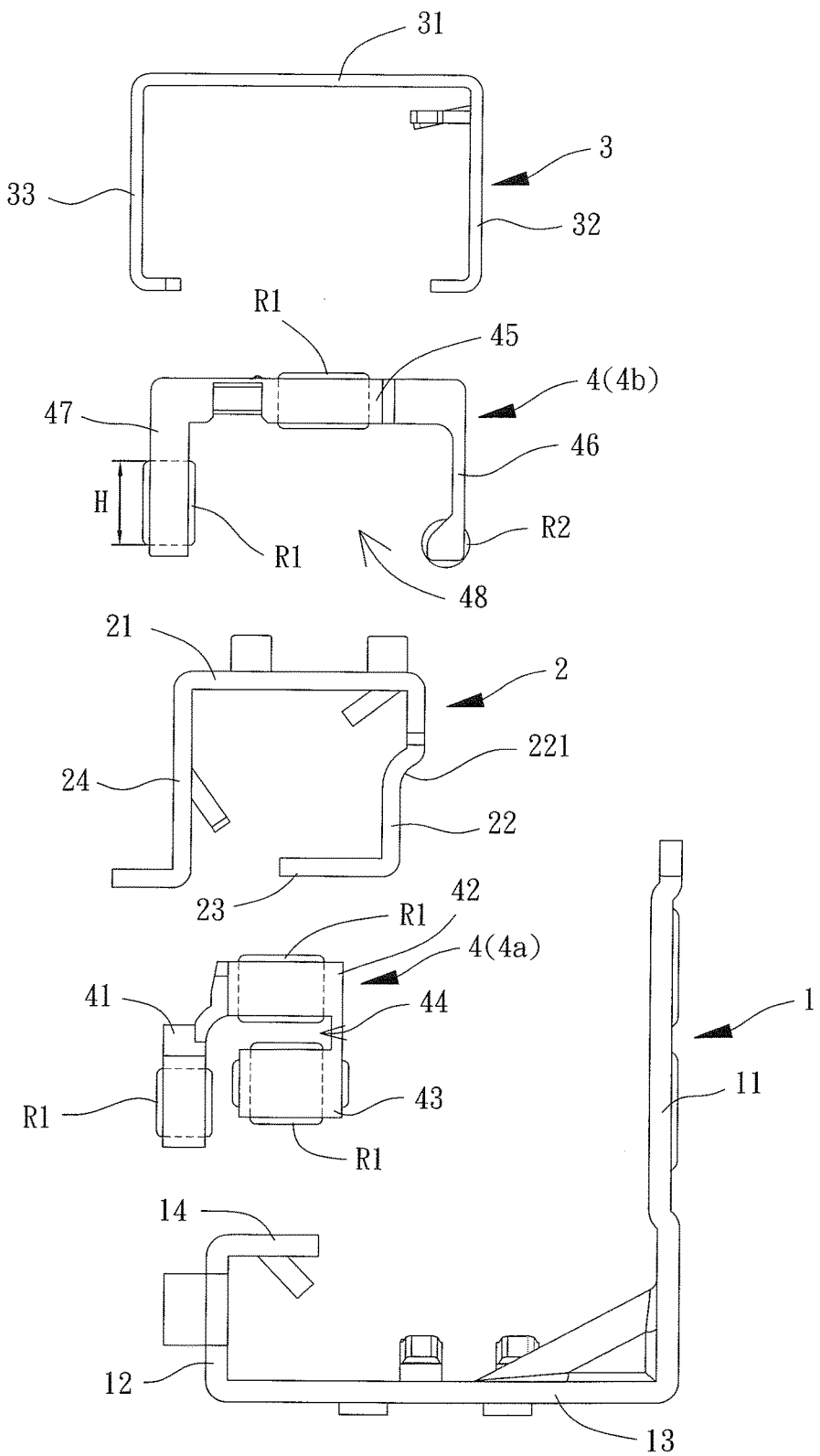
FIG. 2 is an exploded, side view of the undermount slide rail assembly of FIG. 1.

With reference to FIGS. 1 and 2, the main slide rail 1 includes an outer wall 11 and an inner wall 12 opposite to the outer wall 11. The outer wall 11 has a plurality fixing holes 111 for fixing to an inner side of a piece of furniture. An edge of the outer wall 11 is connected by a bottom wall 13 to an edge of the inner wall 12. A primary track 14 extends from the other edge of the inner wall 12 toward the outer wall 11 and is aligned with the bottom wall 13.

Figure 3:
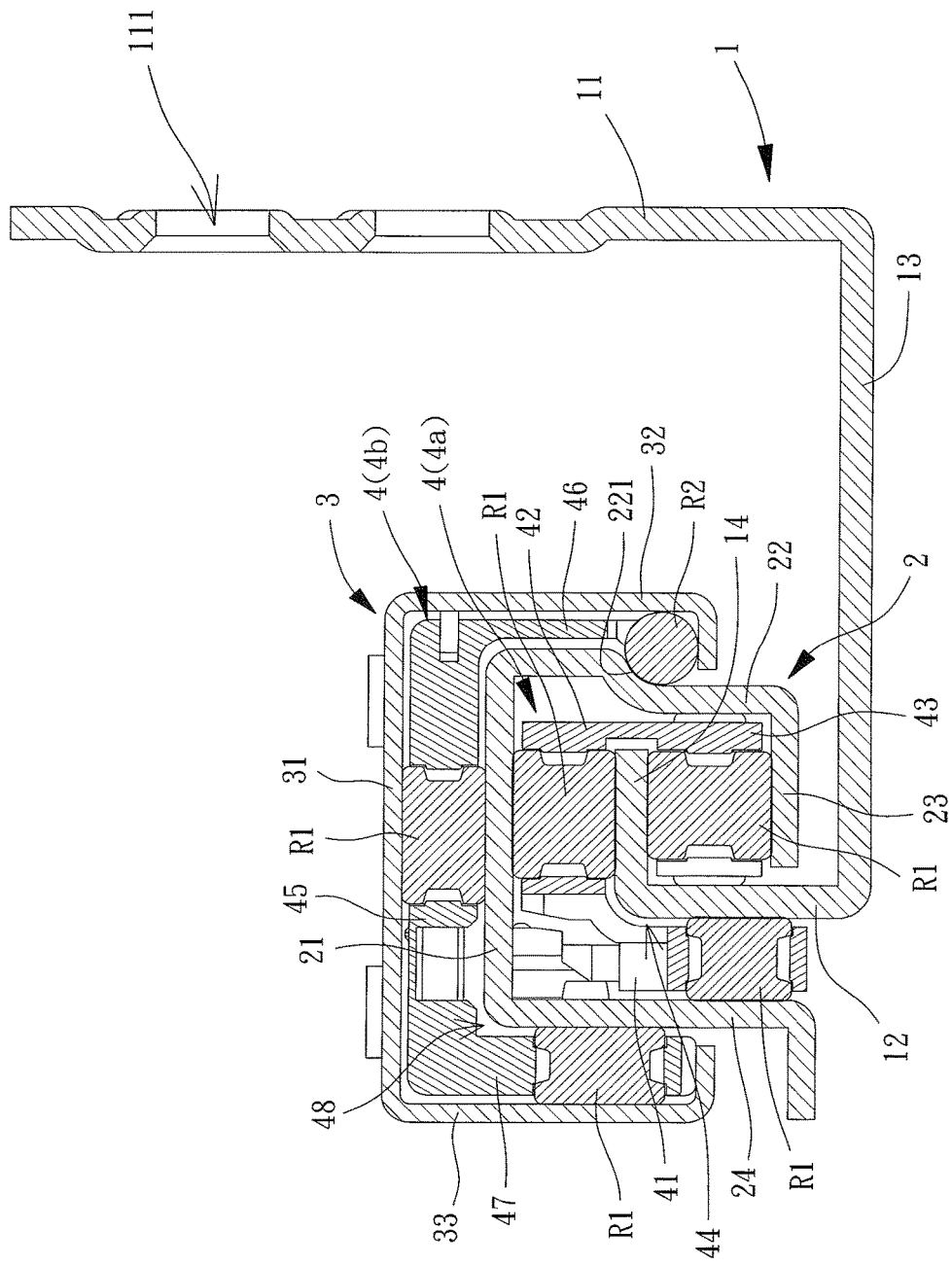
FIG. 3 is a cross sectional view of the undermount slide rail assembly of FIG. 1 after assembly.

With reference to FIG. 3, the inner slide rail 2 includes an auxiliary track 21 and an outer track 22 having an edge connected to an edge of the auxiliary track 21. A bottom track 23 is connected to the other edge of the outer track 22 and is located opposite to the auxiliary track 21. The inner slide rail 2 further includes an inner track 24 connected to the other edge of auxiliary track 21 and is located opposite to the outer track 22. The outer track 22 is located between the primary track 14 and the outer wall 11 of the main slide rail 11. The auxiliary track 21 is located above and aligned with the primary track 14. The bottom track 23 is located below and aligned with the primary track 14 and is located between the primary track 14 and the bottom wall 13 of the main slide rail 1. The inner track 24 is aligned with the inner wall 12 of the main slide rail 1.

The outer slide rail 3 includes an assembling board 31 to be mounted to a bottom face of a drawer. An outer board 32 is connected to a first edge of the assembling board 31. An inner board 33 is connected to a second edge of the assembling board 31 and is located opposite to the outer board 32. The inner slide rail 2 is slideably received in the outer slide rail 3. The assembling board 31 is aligned with the auxiliary track 21 of the inner slide rail 2. The outer board 32 is aligned with the outer track 22 of the inner slide rail 2. The inner board 33 is aligned with the inner track 24 of the inner slide rail 2.

In this embodiment, the at least two sliding assistance boards 4 includes a first sliding assistance board 4a and a second sliding assistance board 4b. The first sliding assistance board 4a is slideably connected to the main slide rail 1 and the inner slide rail 2. The second sliding assistance board 4b is slideably connected to the inner slide rail 2 and the outer slide rail 3. The number and the type of the sliding assistance boards 4 can be varied according to needs.

Furthermore, a plurality of rollers R1 and a plurality of balls R2 are provided. Both of the rollers R1 and the balls R2 are mounted on at least one of sliding assistance boards 4. In the non-restrictive embodiment shown, the second sliding assistance board 4b is provided with the rollers R1 and the balls R2.

With reference to FIGS. 1 and 2, the first sliding assistance board 4a is slideably connected to the primary track 14 and the inner wall 12 of the main slide rail 1 and is in sliding contact with the auxiliary track 21, the bottom track 23, and the inner track 24 of the inner slide rail 2. The first sliding assistance board 4a includes a side groove portion 41, an upper groove portion 42 connected to an upper end of the side groove portion 41, and a lower groove portion 43 located below the upper groove portion 42. The lower groove portion 43 is connected to the upper groove portion 42 from an outer side. A first groove 44 is defined between the side groove portion 41, the upper groove portion 42, and the lower groove portion 43. Some of rollers R1 are received in the side groove portion 41, the upper groove portion 42, and the lower groove portion 43. The axis of each roller R1 received in the upper groove portion 42 is parallel to the axis of each roller R1 received in the lower groove portion 43 and is substantially orthogonal to the axis of each roller R1 received in the side groove portion 41. However, the first sliding assistance board 4a can include more than one upper groove portion 42 and more than one lower groove portion 43 according to need.

With reference to FIGS. 2 and 3, when the first sliding assistance board 4a is mounted between the main slide rail 1 and the inner slide rail 2, the primary track 14 and the inner wall 12 of the main slide rail 1 extend through the first groove 44 of the first sliding assistance board 4a. The rollers R1 mounted in the upper groove portion 42 and the lower groove portion 43 abut upper and lower faces of the primary track 14. The rollers R1 received in the upper groove portion 42 also abut a lower face of the auxiliary track 21 of the inner slide rail 2. The rollers R1 received in the lower groove portion 43 also abut an upper face of the bottom track 23. The rollers R1 received in the side portion 41 abut an inner face of the inner wall 12 of the main slide rail 1 and an outer face of the inner track 24 of the inner slide rail 2.

With reference to FIGS. 1 and 2, the second sliding assistance board 4b is slideably connected to the auxiliary track 21, the outer track 22, and the inner track 24 of the inner slide rail 2 and is in sliding contact with the assembling board 31, the outer board 32, and the inner board 33 of the outer slide rail 3. The second sliding assistance board 4b includes a top groove portion 45, an outer groove portion 46, and an inner groove portion 47. However, the second sliding assistance board 4b can include more than one outer groove portion 46 and more than one inner groove portion 47 according to need. The outer and inner groove portions 46 and 47 are respectively connected to two ends of the top groove portion 45 and extend downward, defining a second groove 48 between the top groove portion 45, the outer groove portion 46, and the inner groove portion 47. Some of the rollers R1 are received in the top groove portion 45 and the inner groove portion 47. The axis of each roller R1 received in the top groove portion 45 is substantially orthogonal to the axis of each roller R1 received in the inner groove portion 47. Furthermore, the balls R2 are received in the outer groove portion 46. Each roller R1 received in the inner groove portion 47 has an axial height H. Each ball R2 is at least partially located within the axial height H in a radial direction of one of the rollers R1 to increase the sliding stability of the second sliding assistance board 4b.

With reference to FIGS. 2 and 3, when the second sliding assistance board 4b is mounted between the inner slide rail 2 and the outer slide rail 3, the inner slide rail 2 extends through the second groove 48. The rollers R1 received in the top groove portion 45 abut an upper face of the auxiliary track 21 of the inner slide rail 2 and a lower face of the assembling board 31 of the outer slide rail 3. The rollers R1 received in the inner groove portion 47 of the second sliding assistance board 4b abut an inner face of the inner track 24 of the inner slide rail 2 and an outer face of the inner board 33 of the outer slide rail 3. The balls R2 received in the outer groove portion 46 abut an outer face of the outer track 22 of the inner slide rail 2 and an inner face of the inner board 32 of the outer slide rail 3.

Alternatively, the balls R2 are mounted in the inner groove portion 47, and some of the rollers R1 are mounted in the outer groove portion 46. In this embodiment, the balls R2 are mounted in the outer groove portion 46, and some of the rollers R1 are mounted in the inner groove portion 47. Furthermore, the outer track 22 of the inner slide rail 2 includes a ball groove 221. The balls R2 are received in the ball groove 221 and are located between the rollers R1 and the outer wall 11 of the main slide rail 1. Thus, the balls R2 can stably and freely rotate in the ball grooves 221 and can provide a hooking effect for the inner slide rail 2 to prevent the outer slide rail 3 from flipping inward. Thus, the balls R2 also increase the sliding stability.

With reference to FIGS. 1 and 3, according to the above structure, when a user pulls the drawer outward, the outer slide rail 3 moves together with the drawer and slides smoothly relative to the inner slide rail 2 through use of the second sliding assistance board 4b. When the second sliding assistance board 4b reaches a stop point at the inner slide rail 2, further outward pulling of the drawer causes the inner slide rail 2 to slide relative to the main slide rail 1, and the smooth relative movement between the inner slide rail 2 and the main slide rail 1 can be assured by the first sliding assistance board 4a.

Since the drawer is opened to a smaller extent while synchronously pulling the outer slide rail 3 outward, the weight of the drawer generates a smaller torque on the whole undermount slide rail assembly. The second sliding assistance board 4b provided with both the rollers R1 and the balls R2 provides a certain extent of stability through use of the rollers R1 and increases the sliding smoothness and reduces the sliding sound through use of the balls R2. As the drawer is further opened to cause outward movement of the inner slide rail 2, the torque resulting from the weight of the drawer acting on the whole undermount slide rail assembly gradually increases. In this case, the rollers R1 on the first sliding assistance board 4a increase the stability during sliding movement of the inner slide rail 2 relative to the main slide rail 1.

In a case that the drawer exerts a smaller load, the first sliding assistance board 4a can be provided with both of rollers R1 and balls R2 to further increase the operational smoothness and to further reduce the sliding sound.

In view of the foregoing, the undermount slide rail assembly according to the present invention provides rollers R1 and balls R2 on at least one sliding assistance board 4 to reduce the sliding sound and to increase the sliding smoothness. Thus, the overall sense of quality is increased.

What is claimed is:

1. An undermount slide rail assembly comprising:
   a main slide rail including an outer wall and an inner wall opposite to the outer wall, with a primary track extending from the inner wall toward the outer wall;
   an inner slide rail including an auxiliary track and an outer track having an edge connected to an edge of the auxiliary track, with the inner slide rail further including a bottom track connected to another edge of the outer track and located opposite to the auxiliary track, and with the inner slide rail further including an inner track connected to another edge of the auxiliary track and located opposite to the outer track;
   an outer slide rail including an assembling board having first and second edges, with the outer slide rail further including an outer board connected to the first edge of the assembling board and an inner board connected to the second edge of the assembling board and located opposite to the outer board, and with the inner slide rail slideably received in the outer slide rail;
   first and second sliding assistance boards, with the first sliding assistance board slideably connected to the main slide rail and the inner slide rail, and with the second sliding assistance board slideably connected to the inner slide rail and the outer slide rail; and
   a plurality of rollers and a plurality of balls, wherein both of the plurality of rollers and the plurality of balls are mounted on at least one of the first and second sliding assistance boards.

2. The undermount slide rail assembly as claimed in claim 1, wherein the outer track of the inner slide rail is located between the primary track and the outer wall of the main slide rail, wherein the auxiliary track of the inner slide rail is located above and aligned with the primary track of the main slide rail, wherein the bottom track of the inner slide rail is located below and aligned with the primary track of the main slide rail, and wherein the inner track of the inner slide rail is aligned with the inner wall of the main slide rail.

3. The undermount slide rail assembly as claimed in claim 1, wherein the assembling board of the outer slide rail is aligned with the auxiliary track of the inner slide rail, wherein the outer board of the outer slide rail is aligned with the outer track of the inner slide rail, and wherein the inner board of the outer slide rail is aligned with the inner track of the inner slide rail.

4. The undermount slide rail assembly as claimed in claim 1, wherein both of the plurality of rollers and the plurality of balls are mounted on the second sliding assistance board between the inner slide rail and the outer slide rail.

5. The undermount slide rail assembly as claimed in claim 4, wherein the outer track of the inner slide rail includes a ball groove, and wherein the plurality of balls is received in the ball groove and is located between the plurality of rollers and the outer wall of the main slide rail.

6. The undermount slide rail assembly as claimed in claim 4, wherein the first sliding assistance board is slideably connected to the primary track and the inner wall of the main slide rail, and wherein the first sliding assistance board is in sliding contact with the auxiliary track, the bottom track, and the inner track of the inner slide rail.

7. The undermount slide rail assembly as claimed in claim 6, wherein the first sliding assistance board includes a side groove portion, an upper groove portion connected to the side groove portion, and a lower groove portion connected to the upper groove portion, wherein a first groove is defined between the side groove portion, the upper groove portion, and the lower groove portion, wherein the primary track and the inner wall of the main slide rail extend through the first groove, and wherein some of the plurality of rollers are received in the side groove portion, the upper groove portion, and the lower groove portion.

8. The undermount slide rail assembly as claimed in claim 4, wherein the second sliding assistance board is slideably connected to the auxiliary track, the outer track, and the inner track of the inner slide rail, and wherein the second sliding assistance board is in sliding contact with the assembling board, the outer board, and the inner board of the outer slide rail.

9. The undermount slide rail assembly as claimed in claim 8, wherein the second sliding assistance board includes a top groove portion, an outer groove portion, and an inner groove portion, wherein the outer and inner groove portions are respectively connected to two ends of the top groove portion, defining a second groove between the top groove portion, the outer groove portion, and the inner groove portion, wherein the inner slide rail extends through the second groove, wherein some of the plurality of rollers are received in the top groove portion and the inner groove portion, and wherein the plurality of balls is received in the outer groove portion.

10. The undermount slide rail assembly as claimed in claim 9, wherein each of the plurality of rollers received in the inner groove portion has an axial height, and wherein each of the plurality of balls is at least partially located within the axial height in a radial direction of one of the plurality of rollers.

\* \* \* \* \*